United States Patent [19]
Lieberman et al.

[11] Patent Number: 5,864,789
[45] Date of Patent: Jan. 26, 1999

[54] SYSTEM AND METHOD FOR CREATING PATTERN-RECOGNIZING COMPUTER STRUCTURES FROM EXAMPLE TEXT

[75] Inventors: Henry A. Lieberman, Cambridge, Mass.; Bonnie A. Nardi, Mountain View; David J. Wright, Santa Clara, both of Calif.

[73] Assignee: Apple Computer, Inc., Cupertino, Calif.

[21] Appl. No.: 669,642

[22] Filed: Jun. 24, 1996

[51] Int. Cl.$^6$ .............................. G06F 17/28; G06F 17/30
[52] U.S. Cl. ...................................... 704/9; 707/6
[58] Field of Search .............................. 704/1, 8–9, 243, 704/244; 707/1–2, 6, 100–103, 513

[56] References Cited

U.S. PATENT DOCUMENTS

| | | | |
|---|---|---|---|
| 5,553,218 | 9/1996 | Li et al. | 707/102 |
| 5,576,954 | 11/1996 | Driscoll | 704/3 |
| 5,598,557 | 1/1997 | Doner et al. | 707/5 |
| 5,649,592 | 7/1997 | Driscoll | 704/9 |
| 5,682,539 | 10/1997 | Conrad et al. | 704/9 |
| 5,696,962 | 12/1997 | Kupiec | 704/9 |

OTHER PUBLICATIONS

Meyers, Brad A. "Tourmaline: Text Formatting by Demonstration," (Chapter 14) in *Watch What I Do: Programming by Demonstration*, edited by Allen Cypher, MIT Press, (Cambridge, MA, 1993), pp. 309–321.

Rus, Daniela and Subramanian, Devika. "Designing Structure–Based Information Agents," AAAI Symposium (Mar. 1994), p. 79–86.

Shoens, K. et al. "The Rufus System: Information Organization for Semi–Structured Data," Published in conjunction with proceedings of the 19th VLDB Conference (Dublin, Ireland 1993), pp. 1–12.

Maulsby, David. "Instructible Agents," Dissertation from the Department of Computer Science at the University of Calgary, (Calgary, Alberta 1994), pp. 178–196.

Schwartz, Peter and Shoens, Kurt. "Managing Change In the Rufus System," Abstract from the IBM Almaden Research Center, date Unknown, pp. 1–16.

*Primary Examiner*—Richemond Dorvil
*Assistant Examiner*—Patrick N. Edouard
*Attorney, Agent, or Firm*—Carr & Ferrell, LLP

[57] ABSTRACT

A system comprises a structure editor, a structure library, an extractor and a user interface, which are stored in computer memory and create structures for recognizing patterns in computer text. The structure editor via the user interface enables a user to input a text string called a model pattern, and uses previously-created structures such as lexical category structures for parsing the model pattern into default definition items. Each default definition item includes attributes specifying the patterns recognizable by the definition item and relationships with other definition items. The structure editor enables and facilitates user modification of the default definition items by generating attribute choices for user selection and allowing a user to generate a new structure if none of the choices is adequate. The resulting definition items form a new definition of a new structure, which is stored in the structure library. The extractor locates a pattern in computer text by satisfying the conditions of a definition of a new structure.

24 Claims, 9 Drawing Sheets

| Structure: | Month |
|---|---|
| " Enter a Known Set of Text Entries" | January February March April May June July August September October November December |
| Structure | Exactly |
| Optional | No |
| Repeats | No |

FIG. 8b

| Structure Name: | Date | | | | | |
|---|---|---|---|---|---|---|
| Example Text | January | | 1 | , | | 1996 |
| Structure | Month | Spaces | Numeric | Punctuation | Spaces | Numeric |
| Optional | No | No | No | No | No | No |
| Repeats | No | No | No | No | No | No |

FIG. 9

SYSTEM AND METHOD FOR CREATING PATTERN-RECOGNIZING COMPUTER STRUCTURES FROM EXAMPLE TEXT

BACKGROUND OF THE INVENTION

1. Field of the Invention

This invention relates generally to structures used to locate patterns in computer text. More particularly, the invention relates to a system and method for creating computer structures from example strings of text.

2. Description of the Background Art

Much text that appears in a computer user's day-to-day activities contains computer recognizable patterns of text that have semantic significance including phone numbers, e-mail addresses, post-office addresses, zip codes and dates. In a typical day, for example, a user may receive extensive word-processing and e-mail text files which contain several of these patterns. A language analysis program referred to as an extractor can then be used to search any of the text document for recognizable patterns. The extractor accesses a data file referred to as a library, which contains computer data referred to as structures. These structures are what the extractor follows when searching computer text to recognize a pattern. A structure comprises one or more definitions, such that the extractor must prove true one of the definitions in order to identify a pattern in the computer text. The application of a structure to computer text by an extractor is termed "parsing".

A conventional notation for defining structures is the Backus Naur Form (BNF), which is both difficult to understand and difficult to write. A definition using BNF consists of the name of the structure (such as the name "Date"), followed by the symbols ":=", further followed by a sequence of definition items. Each definition item in a BNF definition specifies an element of the pattern of text that the structure recognizes. A definition item may be a specific string which causes the extractor to recognize only the specific string; or the definition item may refer to a structure with a plurality of alternative definitions, causing the extractor to recognize any one of a plurality of specific strings. For example, a definition item may specify a lexical category structure which enables the extractor to recognize a particular kind of string such as numbers, letters, punctuation, spaces, tabs, carriage returns or the like.

A BNF structure that recognizes, for example, a date pattern might have a definition written as:

<Date>:=<Month> Number "," Number.

In this example, the definition comprises four definition items. The definition item "<Month>" refers to another structure which may be defined as:

<Month>:="January"|"February". . . |"December";

where the symbol "|" separates alternative definitions. Thus, "Month" is the name of the structure and contains twelve definitions; each definition contains a single definition item consisting of the name of a month. It will be appreciated that both the "Date" and "Month" structures are reducible to a specific expression of lexical category structures and/or exact strings of text.

In a given extractor, a programmer explicitly stores within the structure library appropriate structures for recognizing patterns valuable to a user. Since it is impossible for a programmer to anticipate all possible valuable patterns, it is desirable to provide the user with a means for extending the structure library. Some previous parsing programs enable the user to access the structure library and to add new structures. The drawback of this approach is that many users find it difficult to understand and write these formal structure-defining notations such as BNF. Therefore, a system and method are needed to create pattern-recognizing structures using a simple user interface which does not require specialized programming skills or familiarity with formal structure notations.

SUMMARY OF THE INVENTION

The present invention overcomes the limitations and shortcomings of the prior art with a system and method for enabling a user to create structures from example strings of text. The system of the present invention includes a Central Processing Unit (CPU) that connects to an input device, a display device and memory. The memory advantageously stores program routines comprising a structure editor, a structure library, an extractor and a user interface. The structure editor enables a user to input an example string of text for use as a model pattern. The structure editor instructs the extractor to parse the example string of text into discrete components, such as its lexical components. Based on the parsed model pattern, the structure editor generates a default definition, which the extractor must follow and prove true in order to locate a pattern in selected computer text based on the structure. The structure editor further enables a user to modify the default definition, so that the definition as modified more accurately recognizes patterns helpful to the user. The new structure is stored in the structure library, and the extractor uses the new structure to parse the selected computer text for patterns. The user interface is a program enabling use of the input device and display device for efficiently interacting with the structure editor, the structure library and the extractor.

The present invention also provides methods for creating, modifying, storing and using structures. The preferred method of the invention comprises the steps of enabling a user to input an example string of text for use as the model pattern. The model pattern is parsed into discrete components, and a default definition is generated based on the parsed pattern. The method continues by enabling the user to modify the default definition to more accurately recognize patterns deemed helpful to the user. The structure is then stored in the structure library, and used to parse selected computer text for patterns recognizable to the structure.

BRIEF DESCRIPTION OF THE DRAWINGS

FIG. 8b is a drawing of a window illustrating the generation of multiple definitions for the "Month" structure;

FIG. 9 is a drawing of a window illustrating the resulting "Date" structure.

DETAILED DESCRIPTION OF THE PREFERRED EMBODIMENT

Figure 1:
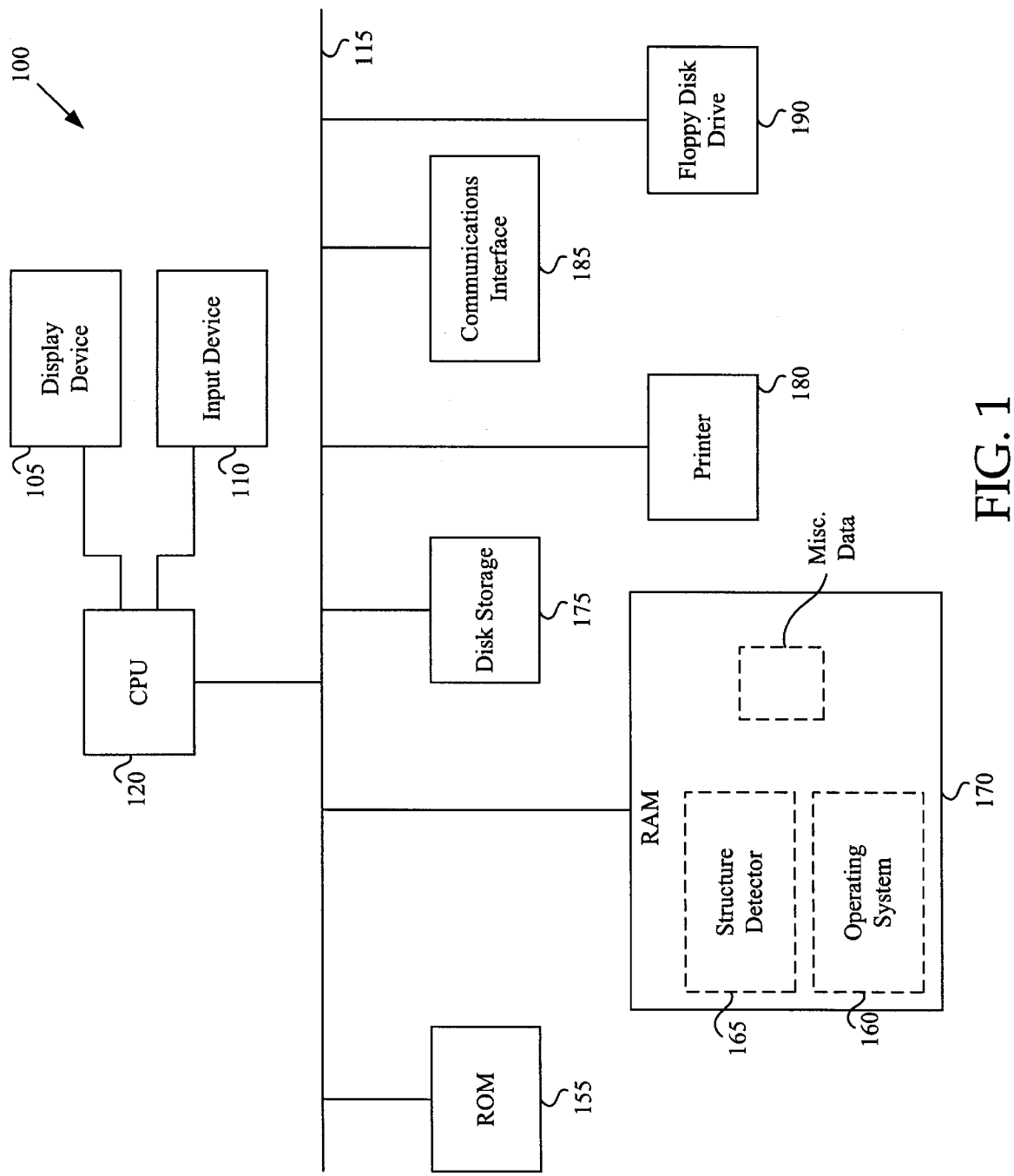
FIG. 1 is a block diagram illustrating a computer system having a structure detector program in accordance with the present invention.

Referring now to FIG. 1, a block diagram is shown of a computer system 100 preferably comprising a microprocessor-based personal computer such as a Macintosh® Computer from Apple Computer, Inc. of Cupertino, Calif., or an IBM® PC. Computer system 100 comprises a Central Processing Unit (CPU) 120 coupled to an input device 110 and a display device 105; and Random Access Memory (RAM) 170 is coupled to the CPU via a signal bus 115. An operating system program 160 residing in RAM 170 controls the processing of the CPU 120. Computer system 100 further comprises Read Only Memory (ROM) 155, disk storage 175, and may also comprise a printer 180, a communications interface 185, and a floppy disk drive 190, each coupled via signal bus 115 to CPU 120. Structure detector 165 is a program which is preferably stored in disk storage 175 and loaded into RAM memory 170 prior to execution by CPU 120. Structure detector 165 provides instructions to CPU 120 enabling a user to create pattern recognizing structures for locating patterns in a text document. This text document is stored in RAM 170. Floppy disk drive 190 may be used to store the structure detector 165 program onto a removable storage medium.

Figure 2:
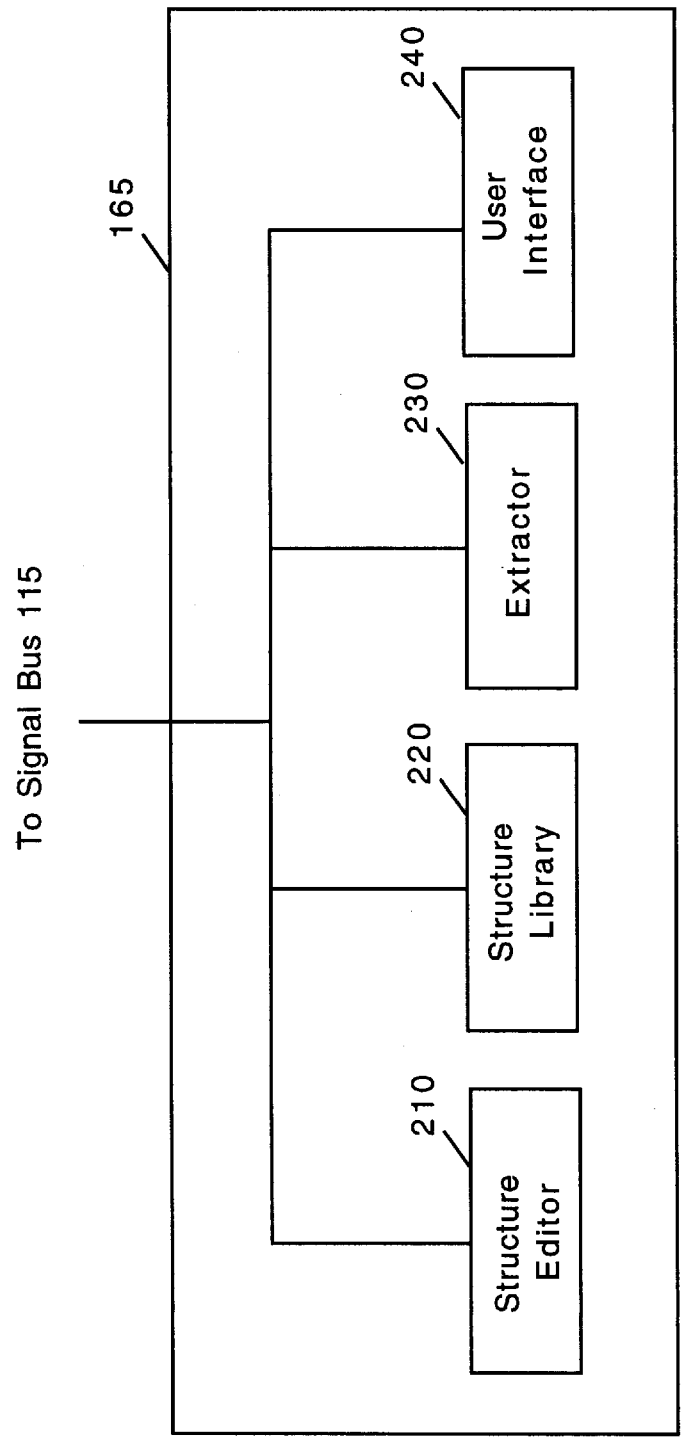
FIG. 2 is a block diagram illustrating the structure detector program of FIG. 1.

Referring now to FIG. 2, a block diagram illustrates details of the structure detector 165 comprising a structure editor 210, a structure library 220, an extractor 230 and a user interface 240. The structure editor 210 is a computer program which enables a user to create structures from example strings of text. Structure library 220 is a collection of previously-created structures, including lexical category structures for recognizing letters, numbers, punctuation, white spaces, tabs, carriage returns and the like. The extractor 230 is a program which utilizes structures stored in the structure library 220 for performing a parsing process on selected computer text. The extractor 230 is used both in the creation of new structures as well as in the location of defined patterns in strings of computer text. User interface 240 is a software program which enables a user to interact efficiently with the structure editor 210, structure library 220 and extractor 230 using the display device 105 and input device 110.

In creating a structure, the user inputs a model pattern preferably by entering text using the input device 110 or by highlighting a text string and initiating the structure editor 210 program routine. The structure editor 210 calls the extractor 230 routine to parse the model pattern according to structures contained in structure library 220. The structure editor 210 generates definition items from the parsed model pattern, using default attributes which describe each of the definition items and the relationships among the definition items.

Figure 3:
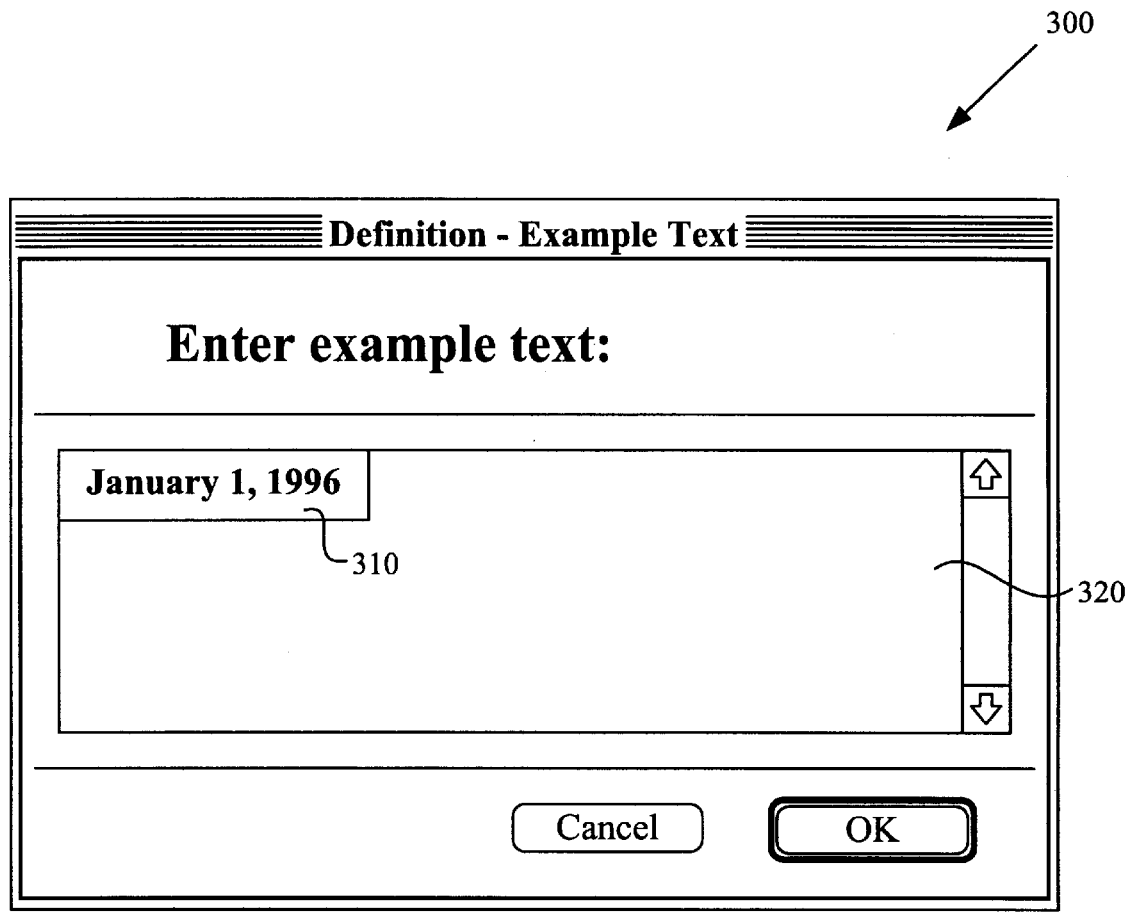
FIG. 3 is a drawing illustrating a dialog box for inputting a model pattern.

Referring now to FIG. 3, an exemplary dialog box 300 illustrates the entry of an example string of computer text for use as a model pattern 310. The dialog box 300 is generated by the structure editor 210 and preferably consists of the model pattern 310 contained within a dialog window 320. The dialog box 300 prompts the user to "Enter example text" using input device 110. The model pattern 310 can be typed into the dialog window 320 or imported from a computer document (not shown) into the window using conventional cut and paste techniques. Other mechanisms for inputting the model pattern, such as microphone receivers, can alternatively be used. The model pattern 310 of FIG. 3, is the date "Jan. 1, 1996".

Figure 4:
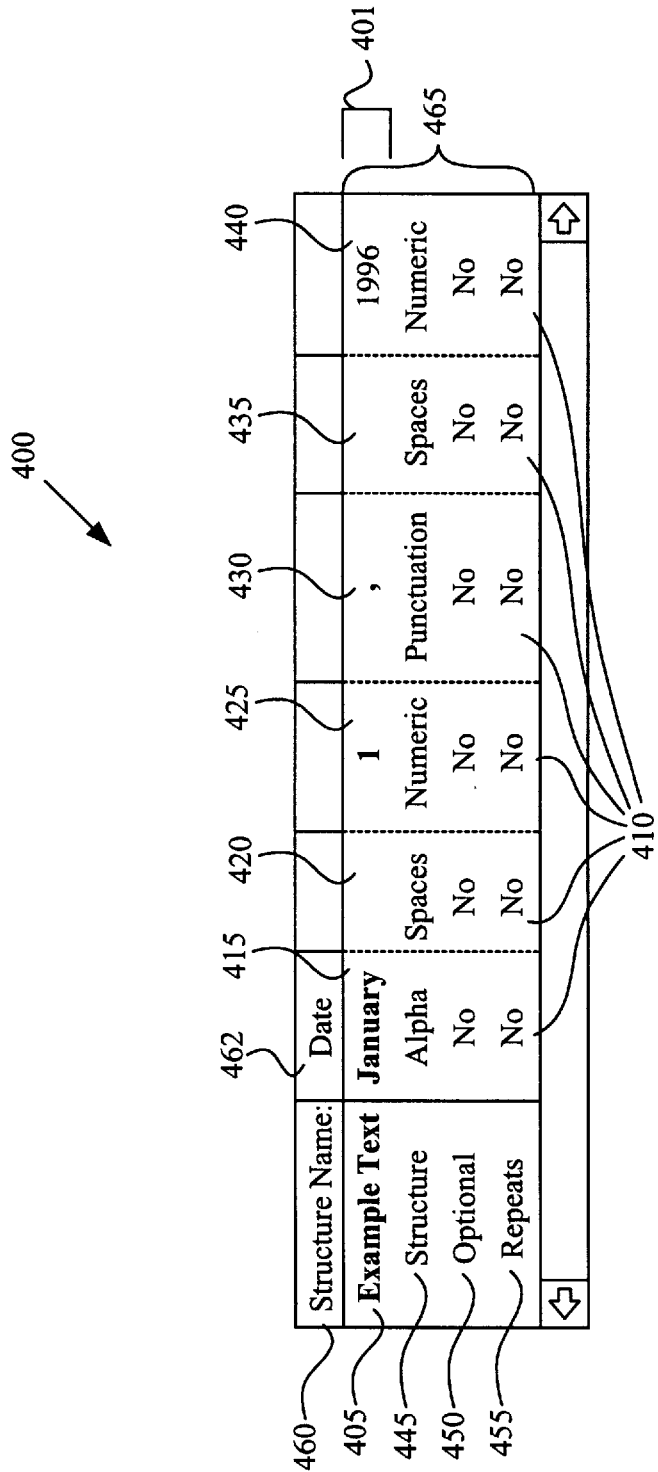
FIG. 4 is a drawing of a table illustrating the parsed model pattern and default definition items for a definition of a "Date" structure.

Referring now to FIG. 4, a table 400 is shown illustrating a default definition 465 with its associated parsed model pattern 401. In this example, the model pattern 310 ("Jan. 1, 1996") is shown parsed into a sequence of lexical components, "Jan.", "(space)", "1", ",", "(space)", "1996". For purposes of the present description, the term "lexical components" broadly refers to general components of text. Lexical components include strings of alphabetic or numeric characters, punctuation, white spaces, tabs, carriage returns and the like.

The table 400 is organized such that a first row 405 contains the label "Example Text", followed by the parsed model pattern 401. User interface 240 prompts the user to select a structure name 460 for the new structure; in this example of FIG. 4, the label 462 "Date" has been entered. The first row 405 also contains the parsed model pattern 401, with each lexical component of the model pattern occupying the first row of a corresponding column. As will be discussed below, each of the columns containing a lexical component forms a definition item 410 consisting of a lexical component plus attributes.

When the model pattern 310 is initially parsed into lexical components, default attributes are assigned to each of the lexical components. The definition items 410 containing default attributes are referred to as default definition items 415–440. The first default definition item 415 includes the lexical component "January", which is a string of letters. A second default definition item 420 follows and includes the lexical component identified as a space (""), and is succeeded by a third default definition item 425 having the text string "1". The fourth default definition item 430 of this parsed model pattern 401 includes the comma "," lexical component. The fifth default definition item 435 of model pattern 401 includes a space, and the last (sixth) default definition item 440 comprises the string of numbers "1996".

Below row 405 containing the label "Example Text" in table 400, are three rows of attributes 445, 450 and 455. The first attribute row contains "Structure reference" attributes 445, which specify the patterns to be recognized by the particular definition items 410. In this example, the first default definition item 415 is assigned a default "Alpha" attribute. The Alpha attribute refers to the fact that the lexical component "January" for the default definition item 415 comprises alphabetical characters. The second and fifth default definition items (420 and 435) are each assigned the "Spaces" default attribute, since the lexical components of these default definition items consist of one or more spaces. The third and sixth default definition items (425 and 440) are each assigned "Numeric" default attributes, since the lexical components of these default definition items consist of numeric characters.

Below the Structure reference attribute 445 row in table 400 is an Optional attribute 450 row. The "Optional" attribute 450 is preferably a binary attribute in which the definition items 410 either have the Optional attribute (YES) or do not have the Optional attribute (NO). If a definition item 410 has the Optional attribute 450 (YES), extractor 230 need not find a match corresponding to that definition item in order to match a pattern in the computer text. In the example of table 400, the Optional attribute 450 row indicates that none of the default definition items (415–440) are optional, and therefore that a match for each item is required to identify a pattern of computer text.

As a second example, a structure for an "E-Mail-Address" may have the definition of "Person", optionally followed by an "@" and a "Host", wherein "Person" and "Host" are each defined as the lexical category structure for alphabetic characters. Here both "@" and "Host" have the Optional attribute (YES). Accordingly, both "smith" and "smith@media" satisfy the definition, and thus extractor 230 will locate either pattern.

Below the Optional attributes 450 row in table 400 is a Repeats attribute 455 row. The "Repeats" attribute 455 enables the recognition of patterns which include multiple instances of a particular pattern. As with the Optional attribute 450, the Repeats attribute 455 is binary, having a value of either "YES" or "NO". For example, an e-mail address structure may include a definition having a first definition item referring to a "Person" structure as a word, a second definition item referring to the "@" symbol, a third definition item referring to a "Domain" structure as a word, and a fourth definition item referring to a "Host" structure as a period (often pronounced "dot" in computer parlance) followed by a word. The fourth definition item might have the "Repeats" attribute, so that the extractor 230 will recognize several occurrences of the dot-and-word sequence, as in "joe@state.univ.edu". The default definition 465 of table 400 contains NO entries in the "Repeats" row 455 for each of the default definition items 415–440. Thus, using definition 465, extractor 230 will not recognize repeating text patterns.

The definition items 410 may include a wide range of other attributes, beyond those illustrated in FIG. 4. An additional attribute might be an order independence attribute which matches a text string to a definition item, irrespective of where it falls relative to other definition items in a model pattern. An example definition item having the Order independent attribute is described with reference to FIG. 9. A second additional attribute is a constraints attribute, which restricts the range of a known field of characters. For example, the constraints attribute for a definition item that consists of numbers may limit the numbers to the range from one to twelve (useful for month references).

This default model pattern 401 illustrated in FIG. 4, represents a date structure having specific definition items arranged in a particular order. One drawback of the date structure of table 400 having the default definition attributes (445–455), is that the extractor 230 using this date structure will recognize patterns other than dates. For example, the extractor 230 will apply this FIG. 4 date structure to identify the text string "George 7? 4391" as a date. Accordingly, user modification of the attributes 445–455 for model pattern 401 may be helpful to more accurately match date patterns.

Figure 5:
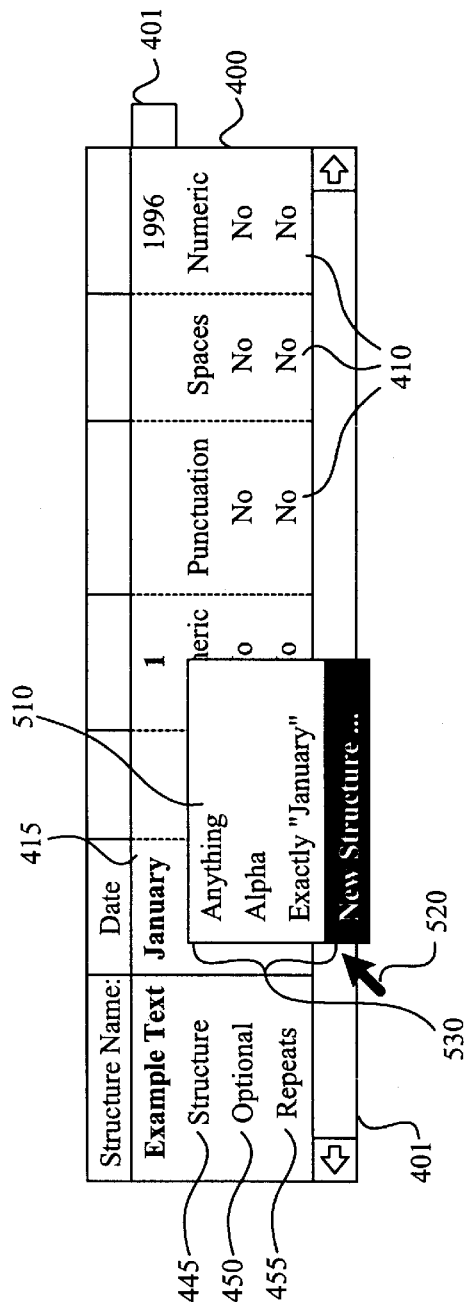
FIG. 5 is a drawing of a window illustrating modification of the structure reference attribute of the first definition item of FIG. 4.

Referring now to FIG. 5, table 400 is shown with an additional pop-up menu 510 for modifying the first definition item 415. The pop-up menu 510 is preferably opened by performing a mouse-down operation while a cursor 520 is positioned adjacent to an attribute 445–455 to be modified. FIG. 5 illustrates selection of the Structure reference attribute 445 for the first definition item 415, corresponding to "January" of parsed model pattern 401. Upon selection of the Structure reference attribute 445, pop-up menu 510 provides a list of alternate structure reference attribute choices 530, preferably in order of increasing specificity.

Menu 510 includes the first choice "Anything" which refers to a previously created structure for recognizing any text string. The next most specific menu choice 530 is "Alpha" which refers to the lexical category structure for recognizing any alphabetic text string. The next most selective menu choice 530 is "Exactly 'January'" which causes extractor 30 to match only the specific string "January". If none of the choices 530 are suitable for locating dates, the choice 530 "New Structure" enables customization of the structure reference attribute 445.

Figure 6:
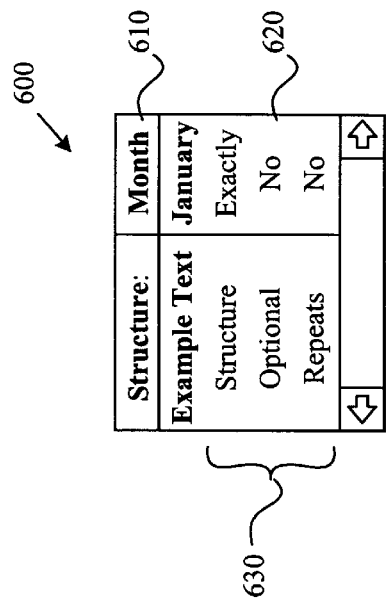
FIG. 6 is a drawing of a window illustrating generation of a first definition for a new "Month" structure.

Referring now to FIG. 6, a window 600 is shown illustrating the generation of a new structure for re-defining structure reference attribute 445 upon selection of choice 530 "New Structure". The structure editor 210 enables the user to enter a structure label 610 to define the new structure. In FIG. 6, the structure label 610 is specified as "Month". Three attributes 630 are available for the new structure: Structure reference, Optional, and Repeats. These attributes 630 have the same meanings as the attributes 445–455 described with reference to FIG. 4. The attributes 630 are preferably assigned default values set as described with reference to FIG. 4. The Structure reference attribute 630 specifies that the example text "January" must exactly match a pattern of text. The Optional attribute 630 is set to a default value of NO as is the Repeats attribute. Modifications can be made to the attributes 630 by changing the attribute entries, in a similar manner as described with reference to FIG. 5. As shown in FIG. 6, the user has modified the structure reference attribute to "Exactly". Thus, based on this new structure, extractor 230 will recognize only the exact string "January". The example text "January" and defined attributes 630 form a definition 620 for the new month structure. Once all changes are made, the structure as defined is stored in library 220. The structure editor 210 returns the user to table 400 for possible additional editing of attributes 445–455.

Figure 7:
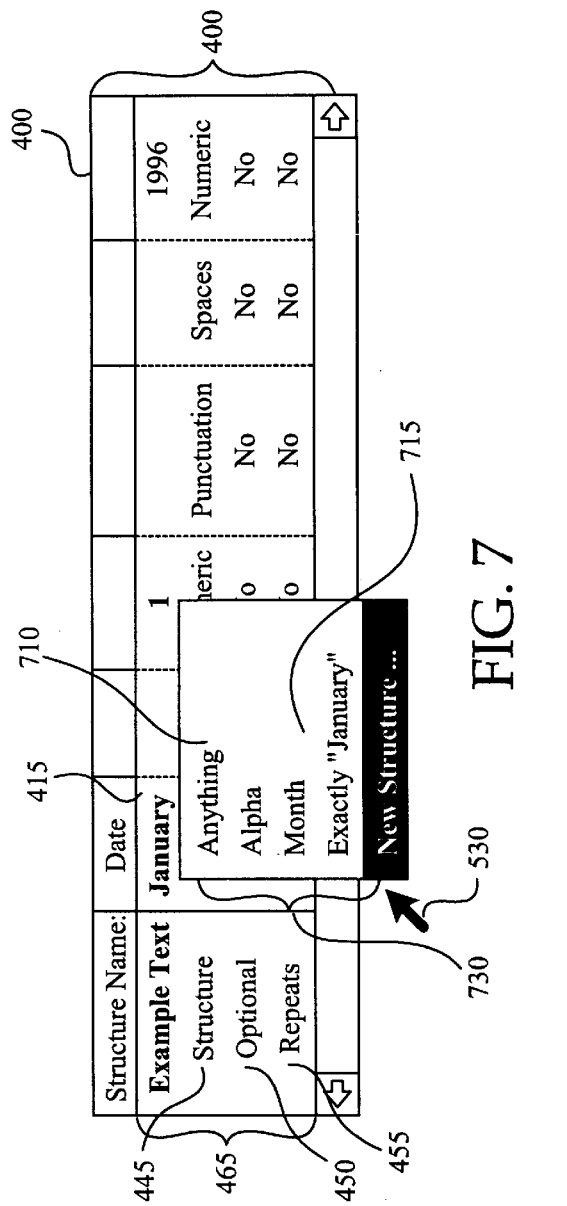
FIG. 7 is a drawing of a window illustrating selection of the newly-generated structure.

Referring now to FIG. 7, table 400 is shown with a pop-up menu 710 containing the new Month choice 715 created as described with reference to FIG. 6. Since the structure Month recognizes the text string "January", the Month choice 715 now appears in the structure pop-up menu 710. However, the "Month" structure as presently defined is incomplete in the practical sense, since it recognizes only the string "January" and does not recognize the remaining months of the year. Thus, structure editor 210 enables user re-selection of the "New Structure" choice 730 from pop-up menu 710 for generating other new structures including alternative definitions for the "Month" structure.

Figure 8A:
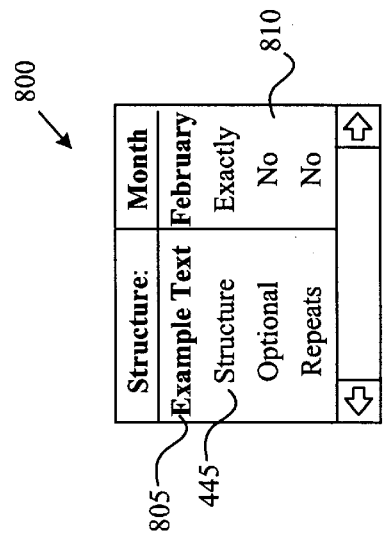
FIG. 8a is a drawing of a window illustrating the generation of a second definition for the "Month" structure.

Referring now to FIG. 8a, a window 800 illustrates the generation of an alternative second definition 810 for the "Month" structure. Upon selection of the New Structure choice 730 in FIG. 7, structure editor 210 creates the default definition as described with reference to FIG. 6. In response to a user interface 240 prompt requesting a structure label 445, a user inputs "Month" 610. Since this is the same label as input in FIG. 6, the structure editor 210 recognizes this new structure as an alternate definition 810 to definition 610. The structure editor 210 enables the user to select the default example text 405 "January" and replace it with the example text 805 "February". Further in a similar manner as that described with reference to FIG. 5, the user modifies the structure reference attribute 445 to "Exactly". When the user completes the modifications, the new structure is stored in library 220. Accordingly, an alternative definition 810 for "Month" is generated. In order to complete the Month structure, this process is carried out for the remaining ten months of the year, i.e. March through December.

Referring now to FIG. 8b, a window 850 is shown illustrating an alternative means for generating multiple example text entries for a particular structure. Upon selection of the New Structure choice 730 in FIG. 7, structure editor 210 creates an entry window 850. Window 850 prompts the user to enter a structure label 610 to define the new structure. The structure label 610 is specified as "Month".

Window 850 further prompts the user in window portion 855 to "Enter a Known Set of Text Entries". Accordingly, the user may input a known set of text entries, such as the months from January to December, into window portion 860. The structure editor 210 recognizes each individual entry in the set, and accordingly creates a definition for each entry. The definitions collectively form the "Month" structure. Window 850 avoids the need for multiple iterations of adding a single definition at a time as described with reference to FIG. 6 and FIG. 8a.

The three attributes 630, Structure reference attribute 445, Optional attribute 450 and Repeats attribute 455, are also available for the "Month" structure. These attributes 630 have the same meanings as the attributes 445–455 described with reference to FIG. 4. As illustrated, the attributes 445–455 are preferably assigned the default values "Exactly", "No" and "No" respectively. Since there are multiple definitions being created with only one set of three attributes, each individual definition includes these attribute values. To create multiple definitions with varying attributes 445–455, another embodiment such as the embodiment described with reference to FIG. 8a must be used.

Referring now to FIG. 9, a table 900 is shown illustrating the resulting "Date" structure following generation of the "Month" structure according to methodology illustrated in FIGS. 4–8. Although the Date structure is now more useful to the extractor 230 in matching months, the remaining default definition items 420–440 will still produce undesired matches. For instance, the Date structure will recognize "February 273? 873847" as a date. The specificity of the above structure may be further improved by defining a structure "Day" which recognizes "numerics" and includes a "constraints" attribute for restricting the range from one to thirty-one. Similarly, the comma can be chosen to recognize exactly ",". Thus, the resulting "Date" structure would be less likely to recognize patterns that are not dates.

Further, the resulting "Date" structure recognizes dates only in American date notation, i.e. "month day, year", and not dates in a European notation i.e. "1 Jan. 1996", because European notation exhibits the date components in a different order and does not contain punctuation. To recognize dates in both American and European notation based on a single definition, the "Date" structure must be modified to include order independence and optional attributes. For example, the definition items 415, 420, 425 and 435 may each include the "order independent" attribute, the definition item 430 based on "," may include the "optional" attribute, and the definition item 440 based on "1996" may remain the same. Using these attributes, extractor 230 identifies patterns with or without commas, and recognizes patterns regardless of the order of the month, day and spaces.

Figure 10:
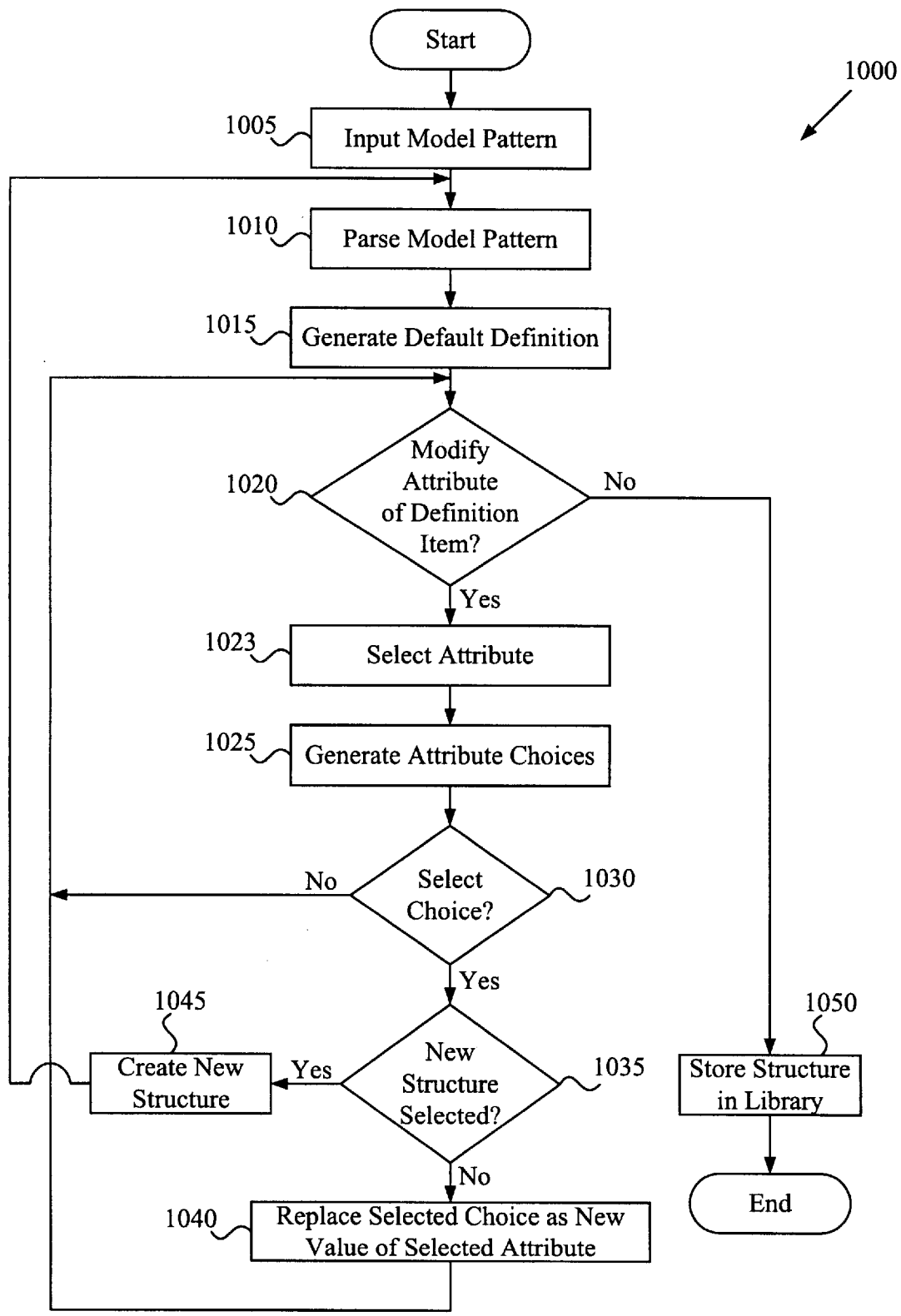
FIG. 10 is a flowchart illustrating a preferred method for creating a structure.

FIG. 10 is a flowchart illustrating a preferred method 1000 for generating a structure from a model pattern 310 in accordance with the present invention. Method 1000 begins with a user inputting a model pattern 310 via input device 110. The inputting 1005 of a model pattern 310 is typically accomplished by typing a computer text string or by importing a text string using conventional selection techniques such as highlighting, cutting and pasting, etc.

Upon receipt of a model pattern 310, structure editor 210 instructs extractor 230 to conventionally parse 1010 the model pattern into its lexical components. Although the model pattern 310 is preferably parsed into its lexical components, it will be appreciated that the model pattern may be parsed 1010 alternatively into other discrete patterns such as dates, times, phone numbers, etc. To accomplish this, structures for these well-known components must have been previously created and stored in the structure library 220 for the extractor 230 to use.

Once the model pattern 310 is parsed 1010, a default definition 465 is generated 1015 by the structure editor 210. The default definition 465 is generated 1015 by generalizing the parsed model pattern 310 into its lexical components. Each lexical component is the basis for a definition item 410, such that the combination and order of definition items form the default definition 465. For example, if the user inputs "Mr. Smith" as the model pattern 310, the lexical categories will be examined and thus the default definition 465 will recognize all patterns of letters, followed by punctuation, followed by spaces, followed again by letters.

To accomplish this generalization of the parsed model pattern 310, each default definition item 410 of definition 465 is generated 1015 to include default attributes. An attribute is data that specifies restrictions on the associated definition item 410 and the relationship of the definition item with other definition items in the definition 465. A default definition item 410 may include a Structure reference attribute 445 and an Optional attribute 450. The Structure reference attribute 445 specifies a string which must be matched identically in order to locate a pattern, or specifies another structure stored in structure library 220 which recognizes a distinct set of patterns. A Structure reference attribute which specifies another structure in structure library 220 will recognize a pattern which itself contains recognizable patterns. For example, a meeting announcement structure may include a definition item with a Structure reference attribute 445 referring to a date or time structure. Thus, when searching for a meeting pattern in selected computer text, the extractor 230 will search for a date or time pattern in a position in the pattern relative to the position of the definition item 410 in the definition.

The Optional attribute is a binary value specifying whether the associated definition item 410 must match an element of a pattern. The default value for the Optional attribute is "NO", thereby requiring that the definition item locate a match in order to locate a pattern. For example, a default definition 465 may be generated which specifies the pattern of letters, followed by punctuation, followed by spaces and followed by letters. Thus, the default definition 465 requires a recognizable pattern only if it has all four lexical components positioned in this order. If the Optional attribute is added to the definition item 410 which recognizes for example punctuation, the pattern of letters, followed by spaces, followed by letters would also be recognizable by the resulting structure.

Other attributes, such as Order Independent and Repeats, are also available. If a definition item includes the Order Independent attribute, then the order of the elements located by the definition 465 need not be in the order specified by the definition items 410. If a definition item 410 includes the Repeats attribute, then the definition item will examine computer text for multiple instances of recognizable patterns. The default definition 465 is generated 1015 such that these other attributes are each assigned a NO value, thereby requiring that a pattern have elements occurring only once and in the order specified by the definition items 410.

The next step in the preferred method 1000 is to test whether the default attributes of the definition items 410 need to be modified 1020. This test can be implemented by examining the level of specificity of the default definition 465 to determine how many undesirable patterns will be recognized by the structure. For example, the definition 465 of letters, punctuation, spaces and letters from the model pattern 310 "Mr. Smith" will recognize all sentence endings such as "end. The". Therefore, it may be helpful to increase the level of specificity of the definition 465 to further limit the number of patterns recognizable by the resulting structure.

If no modifications 1020 to the default definition 465 are deemed to be helpful to the user, the structure in its default form is stored 1050 in structure library 220. The structure library 220 is for example an array of structures, preferably organized in an alphabetic order, enabling the extractor 230 to easily and quickly retrieve structures from the library 220.

If modification 1020 to the level of specificity is deemed valuable, an attribute is selected 1023. An attribute may be selected 1023 by, for example, performing a mouse-down operation while a cursor is over a particular attribute. In response to the selection 1023 of an attribute, attribute choices are generated 1025 using the structure editor 210. Selection of an attribute choice will re-define the value of the attribute selected 1023. For example, if the Structure reference attribute 445 is selected 1023, then attribute choices for re-defining the Structure reference attribute 445 are generated 1025. These attribute choices may include exactly the particular lexical component corresponding to the definition item 410, or a reference to another structure stored in library 220 which recognizes the lexical component. If the lexical component is for example "Smith", the attribute choices may include exactly "Smith", a previously-created structure which recognizes corporate officers including "Smith", or a previously-created catch-all structure labeled "Anything" which recognizes all patterns of text. Further, whenever the Structure Reference attribute choice is selected for modification 1020, the attribute choice "New Structure" is also generated 1025 as an attribute choice. The "New Structure" attribute choice enables creation of a new structure for subsequently re-defining the current value of the Structure Reference attribute 445. Once created, the new structures are stored in the structure library 220. The attribute choices are preferably listed in a pop-up menu 510, and a choice is selected from the list using conventional pop-up menu techniques. If no attribute choice is deemed helpful, then method 1000 returns to step 1020 to test whether any other attribute is to be modified 1020.

If an attribute choice is deemed helpful, then the choice is selected 1030 and method 1000 moves to step 1035 to test whether the selected choice is the "New Structure" choice. If New Structure is not the selected choice, then the selected attribute choice replaces 1040 the current value of the attribute selected for modification 1020. For example, if the Structure reference attribute 445 for "Smith" currently specifies the lexical category structure for letters, and the attribute choice selected 1030 is "Exactly Smith", "Exactly Smith" replaces 1040 the current lexical category structure for letters. Thus, the resulting structure will recognize text patterns which have "Smith" in the appropriate position of the pattern.

If the attribute choice selected 1035 is "New Structure" then a new structure is created 1045 and stored in the structure library 220 using structure editor 210. A new structure is created by generating a new and independent definition, based on the lexical component or components associated with the definition item or items 410 being modified 1020. The new definition comprises attributes which are generated in a manner identical to those generated with reference to step 1010 and 1015, and are modified using the same process as described above with reference to steps 1020 to 1040. However, the new definition is assigned its own label 610 and thus specifies a new structure. Further, this process of generating a new structure can be repeated and the same label 610 used, thereby generating multiple definitions for the single new structure. Upon completion of the new structure, method 1000 returns to step 1020 to enable the steps including selection 1023 of the Structure reference attribute 445, selection 1030 of the newly-created structure, and replacement 1040 of its current value. If no more modifications are deemed helpful, the structure is stored in library 220 and method 1000 ends.

The foregoing description of the preferred embodiments of the invention is only by way of example, and other variations of the above-described embodiments and methods are provided by the present invention. For example, the structure detector can be stored in RAM, ROM, disk, or in dedicated hardware. Although the system has been described as using a keyboard/mouse type input device, input devices such as speech recognition systems can alternatively be used. Further, although the system has been described as using a display type device, various equivalent output devices known in the art can alternatively be used for presenting computer data. The embodiments described herein have been presented for purposes of illustration and are not intended to be exhaustive or limiting, and many variations and modifications are possible in light of the foregoing teaching. The system is limited only by the following claims.

What is claimed is:

1. A computer-based method for using a model pattern to create a structure to identify patterns in computer text, the method comprising the steps of:

inputting a model pattern;

parsing the model pattern into components based on previously-created structures;

generating user-modifiable default definition items based on the components, wherein the default definition items specify a definition of a new structure; and identifying patterns in computer text based on the new structure.

2. The method of claim 1, wherein the previously-created structures comprise lexical category structures.

3. The method of claim 1, wherein the model pattern is obtained by inputting a string of computer text.

4. The method of claim 1, wherein each definition item includes a structure reference attribute denoting a set of patterns that are recognized by the definition item.

5. The method of claim 4, further comprising, after the step of generating and before the step of identifying, the step of modifying the structure reference attributes.

6. The method of claim 4, further comprising, after the step of generating and before the step of identifying, the steps of:

providing choices for redefining the structure reference attribute;

enabling user selection of one of the choices; and modifying the structure reference attribute to refer to the selected choice.

7. The method of claim 6, further comprising the steps of:

generating another new structure; and modifying the structure reference attribute to refer to the other new structure.

8. The method of claim 1, wherein each definition item includes a structure reference attribute denoting a set of patterns that are recognized by the definition item, and wherein the definition item comprises further attributes selected from the group consisting of "optional", "repeating", "order independent", and "constraints".

9. A computer-based system for creating a structure to identify patterns in computer text based on a model pattern, the system comprising:

a central processor unit for processing computer text;

input means coupled to the central processor unit for receiving information from a user;

display means coupled to the central processor unit for displaying information to a user; and a memory coupled to the central processor unit, wherein the memory contains stored computer text, and further contains information comprising:

a structure library containing previously-created structures;

a structure editor containing program instructions for enabling input of a model pattern through said input means, parsing the model pattern into components based on the previously-created structures, and generating user-modifiable default definition items based on the components, wherein the default definition items specify a first definition of a new structure; and an extractor containing program instructions for identifying patterns in the stored computer text based on the new structure.

10. The system of claim 9, wherein the previously-created structures include lexical category structures.

11. The system of claim 10, wherein the lexical category structures include structures for recognizing numbers, letters, punctuation, spaces, tabs, and carriage returns.

12. The system of claim 9, wherein each definition item includes a structure reference attribute denoting a set of patterns that are recognized by the definition item.

13. The system of claim 12, wherein the component of the model pattern corresponding to the definition item is a member of the set of patterns.

14. The system of claim 12, further comprising a user interface containing program instructions for enabling user modification of the structure reference attribute by the input means and display means.

15. The system of claim 14, wherein the user interface enables user creation of another structure and modification of the structure reference attribute to refer to the other structure.

16. The system of claim 9, wherein the previously-created structures include lexical category structures, and each definition item includes a structure reference attribute denoting a set of patterns that are recognized by the definition item.

17. The system of claim 16, wherein the default value of each structure reference attribute refers to the lexical category structures.

18. The system of claim 9, wherein each definition item includes a structure reference attribute denoting a set of patterns that are recognized by the definition item, and wherein the definition item comprises further attributes selected from the group consisting of "optional", "repeating", "order independent", and "constraints".

19. The system of claim 18, wherein the default values of the further attributes are "NO".

20. The system of claim 9, wherein each definition item includes a structure reference attribute denoting a set of patterns that are recognized by the definition item, and further comprising a user interface for generating choices to redefine each structure reference attribute and for displaying the choices by the display means for selection by the input means.

21. The system of claim 20, wherein the choices include the component corresponding to the selected definition item.

22. The system of claim 20, wherein the choices include all previously created structures recognizing the component of the model pattern corresponding to the definition item.

23. The system of claim 9, wherein each structure includes a label, and wherein the structure editor generates alternative definitions for a structure by assigning the same label to different definitions.

24. A program storage medium having a program stored therein for causing a computer to perform the steps of:

inputting a model pattern;

parsing the model pattern into components based on previously-created structures;

generating default definition items based on the components, wherein the default definition items specify a definition of a new structure;

enabling user modification of the default definition items; and identifying patterns in computer text based on the new structure.

* * * * *